United States Patent
Landt

(10) Patent No.: US 8,172,653 B2
(45) Date of Patent: May 8, 2012

(54) APPARATUS AND METHOD FOR AUTOMATED CUTTING OF THE WINGS FROM POULTRY BODIES

(75) Inventor: Andreas Landt, Lübeck (DE)

(73) Assignee: Nordischer Maschinenbau Rud. Baader GmbH + Co. KG (DE)

(*) Notice: Subject to any disclaimer, the term of this patent is extended or adjusted under 35 U.S.C. 154(b) by 0 days.

(21) Appl. No.: 13/183,324

(22) Filed: Jul. 14, 2011

(65) Prior Publication Data

US 2012/0045980 A1   Feb. 23, 2012

(30) Foreign Application Priority Data

Aug. 20, 2010   (DE) .......................... 10 2010 035 387

(51) Int. Cl.
*A22C 18/00*   (2006.01)
(52) U.S. Cl. ........................................................ 452/151
(58) Field of Classification Search .......... 452/149–155, 452/160, 165, 166, 170
See application file for complete search history.

(56) References Cited

U.S. PATENT DOCUMENTS

| | | | |
|---|---|---|---|
| 4,016,624 A | 4/1977 | Martin et al. | |
| 5,569,069 A | 10/1996 | Horst et al. | |
| 5,618,230 A * | 4/1997 | Bargele et al. | 452/169 |
| 6,007,416 A * | 12/1999 | Janssen et al. | 452/135 |
| 6,277,020 B1 * | 8/2001 | Stephens | 452/135 |
| 6,383,068 B1 * | 5/2002 | Tollett et al. | 452/170 |
| 6,736,717 B1 * | 5/2004 | Annema et al. | 452/172 |
| 7,204,748 B2 * | 4/2007 | Gasbarro | 452/149 |
| 7,662,033 B1 * | 2/2010 | Ritter et al. | 452/160 |
| 2010/0317272 A1 | 12/2010 | Hazenbrock et al. | |

FOREIGN PATENT DOCUMENTS

DE   4304781 C1   9/1994

* cited by examiner

*Primary Examiner* — Richard Price, Jr.
(74) *Attorney, Agent, or Firm* — Workman Nydegger

(57) ABSTRACT

An apparatus and method for automated cutting of the wings from poultry bodies are disclosed. The apparatus has transport units that are arranged on each side of the conveying means, each of which includes a guide rail and a conveying chain. The transport units are arranged symmetrically to the conveying means and diverge in the direction of transport T in such a way that the two wings of a poultry body are moved increasingly away from the poultry body during transport along the separating device. The cutting blades of the third pair of separating elements form a cutting station without a counter-support and each has a cutting edge which performs partial cuts leaving the end pieces of the wings on the poultry body. The lateral guide rails behind the separating device each have a recess to increase the vertical distance between the guide rail and the conveying chain.

20 Claims, 2 Drawing Sheets

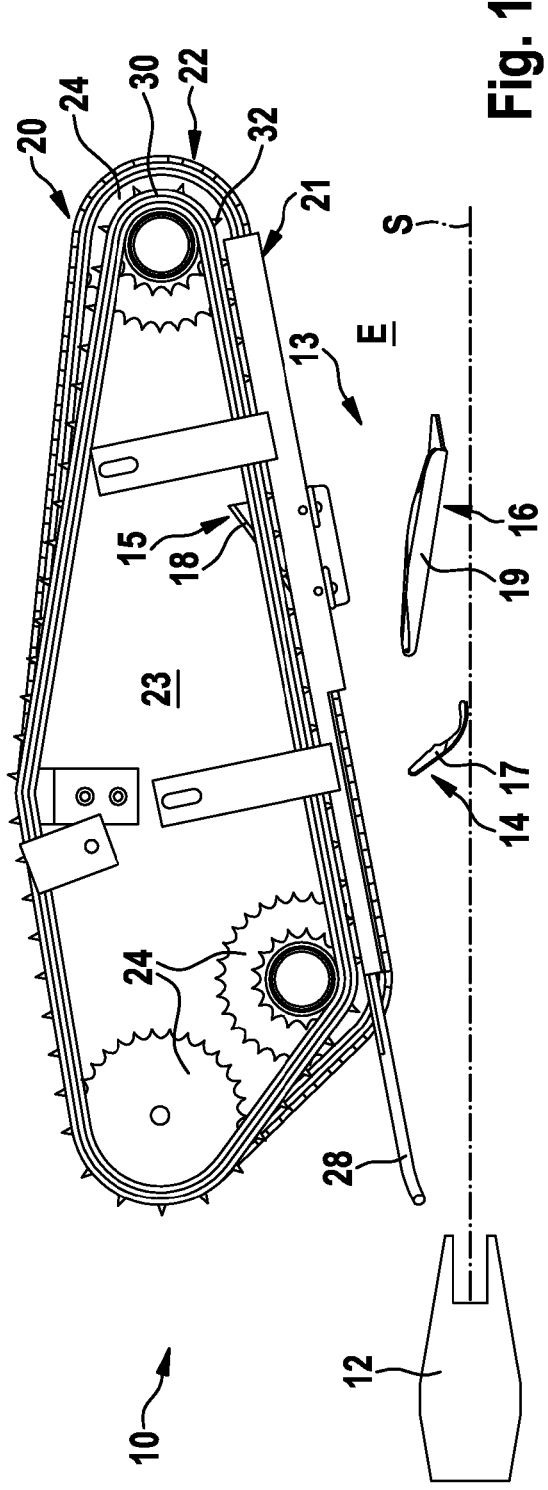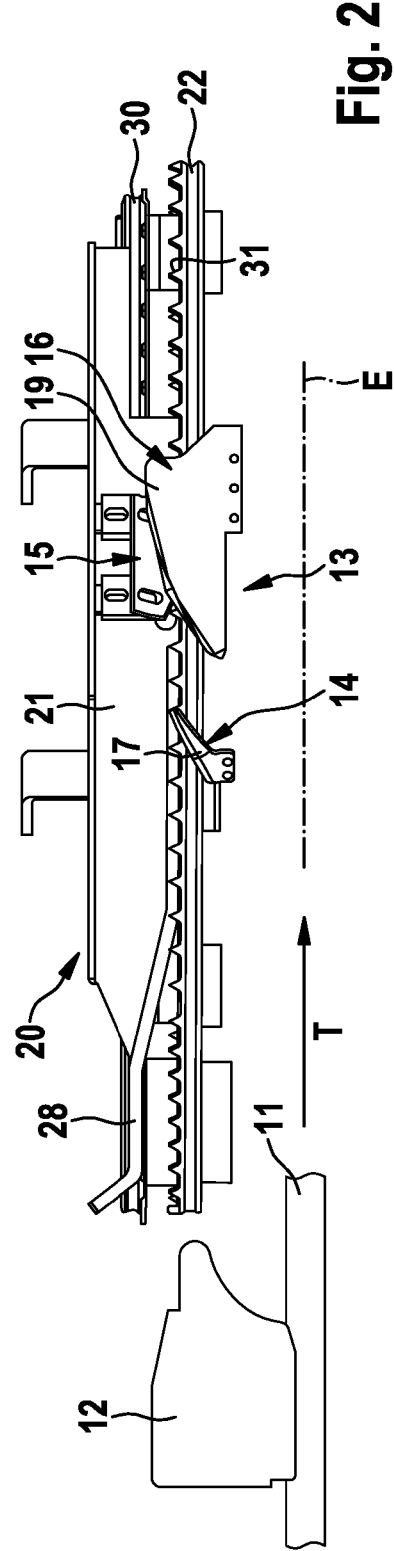

APPARATUS AND METHOD FOR AUTOMATED CUTTING OF THE WINGS FROM POULTRY BODIES

CROSS-REFERENCE TO RELATED APPLICATIONS

This application claims the benefit of German Patent Application No. 10 2010 035 387.6, filed on Aug. 20, 2010, entitled "APPARATUS AND METHOD FOR AUTOMATED CUTTING OF THE WINGS FROM POULTRY BODIES", which is incorporated herein by reference.

BACKGROUND OF THE INVENTION

Apparatuses and methods for automated cutting of the wings from poultry bodies are often used in the food-processing industry. The bodies of slaughtered poultry such as e.g. chicken, turkey, etc. have the actual poultry body with the wings attached thereto before further treatment and processing. The wings basically have a structure of three components. The so-called end piece is directly attached to the poultry body by a joint. The so-called central piece is arranged on the end piece via a further joint, wherein the so-called tip is arranged on the central piece on the side facing away from the end piece.

Apparatuses and methods are known in which the wings altogether, that is, including the end pieces, are separated from the poultry body. Such an apparatus is known from DE 43 04 781 C1, for example. The apparatus for separating the wings which is described therein has two cutting blades of the third pair of separating elements are constructed as so-called delta blades. These delta blades have, apart from a main body, a beak which is forwardly directed in the direction of transport T and which serves to extend the cutting edge beyond the main body. To put it another way, the cutting blades have a normally ascending cutting edge which extends from the main body into the region of the beak. One counter-support, each, is associated with these cutting blades in order to ensure cutting through the tendons and tissue parts which are left at the first cut.

Due to the two transport units, for which an operative connection is made in each case between the guide rail and the conveying chain, and by which the wings are, so to speak, clamped in the region of the joint between the end piece and the central piece, in such a way that a portion (the central piece with the tip) of the wing is located on the side of the guide rails facing away from the poultry body during transport along the separating device, and the portion (end piece) of the wing attached to the poultry body is located on the side of the guide rail facing towards the poultry body, the balls of the joints are pulled out of the sockets in particular at the junction from the end piece to the poultry body, so that the incisions of the first pair of separating blades and of the third pair of separating blades are made without damaging the bones.

As the end pieces are separated completely from the poultry body by the third pair of cutting blades, the poultry body itself can be transported out of the apparatus by the conveying means in the direction of transport T, while the separated wings or the end pieces which are left are clamped by the transport units, transported as far as the end of the guide rails, and then transported laterally away from the conveying means by the conveying chains. To sum up, with the known methods with the first pair of separating elements a kind of preliminary cut is made, in order to prepare for complete separation of the wings in the region between the end pieces of the wings and the poultry body with the third pair of separating elements, or create sufficient space for the latter to engage in the region of the joint between the end piece and the poultry body, while previously the central pieces (with or without tip) are removed from the end pieces with the second pair of separating elements.

However, it has turned out that it may be desired not to separate the end pieces of the wings completely from the poultry body or from the breast fillet, in order then to present the latter with the wing end piece attached to the breast fillet in an upright position. In this connection, the so-called premium cut is spoken of. As the previous apparatuses and methods however are exclusively designed to separate the wings completely including the end pieces from the poultry body, manual activity is always necessary. The whole cuts can be performed manually. Alternatively, the known automated methods can be stopped after complete separation of the wings between the end pieces and the central pieces, that is, the second separating cut, and the last step can be performed manually. However, the manual effort is firstly very high and therefore cost-intensive. Secondly, manual separation requires a lot of experience, so that the quality of premium cuts fluctuates, depending on the operator.

BRIEF SUMMARY OF THE INVENTION

The invention as claimed concerns an apparatus for automated cutting of the wings from poultry bodies, comprising a conveying means having at least one transport saddle for receiving and holding the poultry bodies and transporting them, with the breast facing upwards and with the neck attachment facing forward in the direction of transport T, through the apparatus along a separating device, the separating device, which has several pairs of separating elements each arranged symmetrically on both sides of the conveying means, namely a first pair of cutting blades for performing tendon separating cuts from the rear side of the poultry body in the region of the joint between the end pieces of the wings and the poultry body, a second pair of separating blades for completely separating the wings between the end pieces and the central pieces of the wings and a third pair of cutting blades for performing further tendon separating cuts from the rear side of the poultry body in the region of the joints between the end pieces of the wings and the poultry body, and a pair of guide rails and a pair of revolving conveying chains, wherein on each side of the conveying means is arranged a transport unit which is composed of a guide rail and a conveying chain and which extends from a region in front of the separating device in the direction of transport T to a point behind the separating device and is constructed and designed for gripping and guiding the wings along the separating device, wherein the two transport units arranged symmetrically to the conveying means diverge in the direction of transport T in such a way that the two wings of a poultry body are moved increasingly away from the poultry body during transport along the separating device.

Furthermore, the invention concerns a method for automated cutting of the wings from poultry bodies, comprising the steps of: delivering the poultry bodies by a conveying means into the region of a separating device which has several pairs of separating elements each arranged symmetrically on both sides of a conveying means, clamping the wings in the region of the joint between the end piece and the central piece of the wing in each case between a guide rail and a conveying chain of a transport unit arranged on both sides of the conveying means, separating tendons and tissue parts from the rear side of the poultry body in the region of the joint between the end pieces of the wings and the poultry body by means of a first pair of cutting blades, completely separating the wings between the end pieces and the central pieces of the wings by means of a second pair of separating blades, separating tendons and tissue parts from the rear side of the poultry body in the region of the joint between the end pieces of the wings and the poultry body by means of a third pair of cutting blades, wherein the wings are increasingly pulled outwards away from the poultry body by the transport units during transport in the direction of transport T and all cuts are made during transport of the poultry bodies along the pairs of separating elements.

It is therefore the object to provide an apparatus which ensures a fully automated premium cut. The further object is to propose a corresponding method.

This object is achieved by an apparatus of the kind mentioned hereinbefore by the fact that the cutting blades of the third pair form a cutting station without a counter-support and each have a cutting edge which is constructed and designed to perform partial cuts leaving the end pieces of the wings on the poultry body, and that the lateral guide rails behind the separating device in the direction of transport T each have a recess to increase the vertical distance between the guide rail and the conveying chain. By dispensing with a counter-support, the product can at least slightly escape the pressure on the product exerted by the cutting blades, so that it is made difficult to cut through completely. The cutting edge of the cutting blades is, by contrast with the state of the art, constructed as a kind of stub edge, so that the length of the cutting edge is shorter than the known cutting blades.

As a result, in their cutting position the cutting blades leave a portion of the tendons and tissue parts in the region of the joint between the end pieces and the poultry body. In connection with the absence of a counter-support, the design of the cutting station according to the invention is not able in any position to completely separate the end piece from the poultry body. Due to the recesses in the guide rails and the resulting increase in distance between the guide rails and the conveying chains, clamping of the wings or end pieces is eliminated. To put it another way, a free space for the wings or the end pieces is created by the recess, so that they can be released from the operative connection between the guide rails and the conveying chains and can shoot back to the poultry body due to the abrupt ending of the diverging transport. The further revolving conveying chain is then—due to the absence of an operative connection to the associated guide rail—no longer able to separate or tear the end pieces of the wings from the poultry body. The size of the recess is not geometrically limited in an upward direction, starting from the lower edge, and can also mean that the guide rail ends behind the separating device in the direction of transport T. Due to the combination of features according to the invention, it is possible to perform the premium cut in a completely automated fashion in the case of poultry bodies.

An appropriate development of the invention as claimed is distinguished in that the cutting blades of the third pair are constructed as approximately triangular delta blades, and the cutting edges facing towards the poultry body have in the direction of transport T a first, blunt section on the input side, a second, sharp-edged section in the middle and a third, blunt section on the output side. Due to the fact that, at least in the end region of the cutting blades, a blunt section is provided, a partial cut which leaves the end piece on the poultry body is assisted. The section formed on the input side, which is also blunt, makes it easier to thread the cutting blades to the preliminary cut performed by the first pair of cutting blades.

Advantageously, the third section of the cutting edge in the direction of transport T has a lower gradient than the first two sections, referred to the plane of transport E of the poultry bodies. The gradient of the cutting edge extends obliquely upwards in the direction of transport T, starting from the plane of transport E which is defined by the conveying means, so that the poultry bodies run up onto the cutting blades, which are stationary during cutting, in the fashion of a ramp. Due to the fact that the last section of the cutting edge has a lower gradient than the previous sections, which can also be zero (horizontal) or negative (descending), contact of the cutting edges with the poultry body or with the joint between the end pieces and the poultry body can be reduced or completely eliminated, which in turn assists the partial cut that leaves the end piece on the poultry body.

A further particularly preferred embodiment of the invention is characterised in that the recesses of the guide rails begin immediately behind the last pair of separating elements in the direction of transport T and extend as far as the free end of the guide rails in the direction of transport T. As a result, quasi a release zone is provided, so that the end pieces can be reliably released before the conveying chain stops running parallel to the guide rails.

Another development is distinguished in that the recesses extend over at least half the height of the guide rails, each starting from the lower edge of the guide rails facing towards the conveying chain. Due to the extent of the recesses in the vertical direction according to the invention, starting from the conveying chain, sufficient space is created to release the end pieces from clamping.

The object is also achieved by a method having the steps mentioned hereinbefore by the fact that the separation of tendons and tissue parts by means of the third pair of cutting blades is effected without a counter-support and only so deep into the region of the joint that the end pieces of the wings with at least one tendon as well as tissue parts remain on the poultry body, wherein the end pieces immediately after the last cut are released from clamping by a recess in the guide rails of the transport unit. "Immediately" in this context means that the end pieces are released before they are carried laterally away from the conveying element by the conveying chain. The advantages resulting from the steps according to the invention have already been described in connection with the apparatus according to the invention, on account of which reference is made to the corresponding passages to avoid repetition.

These and other objects and features of the present invention will become more fully apparent from the following description and appended claims, or may be learned by the practice of the invention as set forth hereinafter.

BRIEF DESCRIPTION OF THE DRAWINGS

Further appropriate and/or advantageous features and embodiments are apparent from the subsidiary claims and the description. Embodiments of the invention as claimed, as well as associated methods, are described in more detail with the aid of the attached drawings.

FIG. 1 shows a top view of the apparatus according to the invention, only one side of the apparatus being shown for purposes of clarity.

FIG. 2 shows side view of the apparatus according to view II-II.

DETAILED DESCRIPTION OF THE PREFERRED EMBODIMENTS

Figure 3:
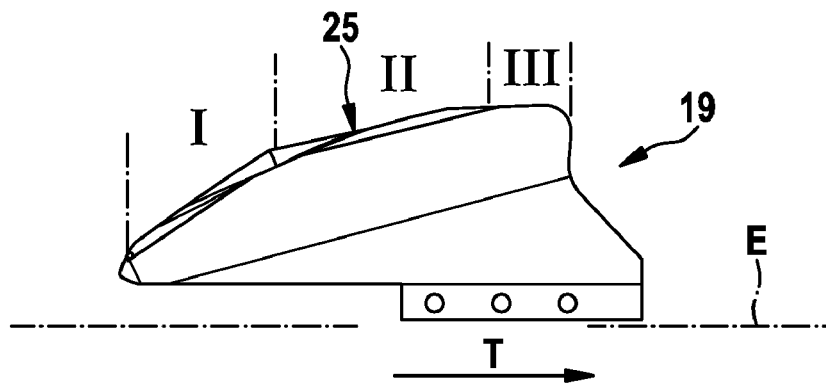
FIG. 3 shows a side view of a cutting blade of the third pair of separating elements.
Figure 4:
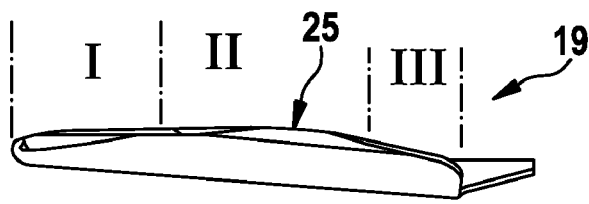
FIG. 4 shows a top view of the cutting blade as in FIG. 3.
Figure 5:
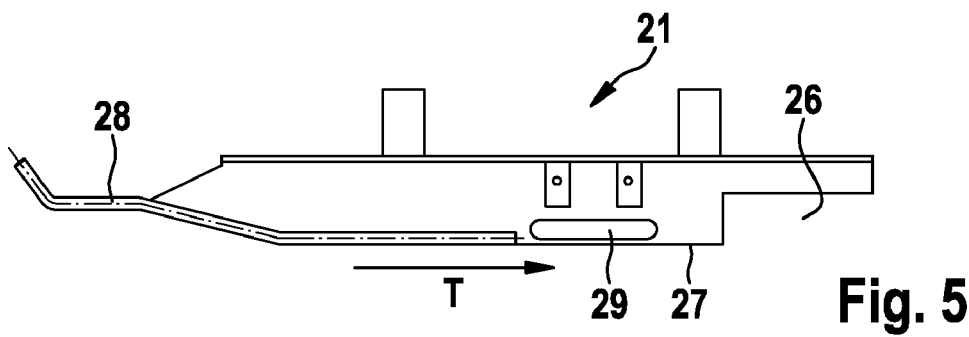
FIG. 5 shows a side view of a guide rail.
Figure 6:
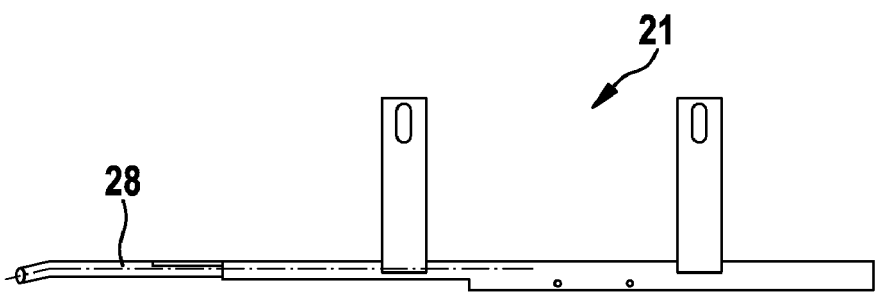
FIG. 6 shows a top view of the guide rail as in FIG. 5.

The apparatus shown in the drawings is constructed and designed for partially removing the wings from a poultry body. The apparatus 10 shown in FIG. 1 for cutting the wings off poultry bodies is shown only partially, namely only for treating poultry bodies on one side. Symmetrically to the axis of symmetry S is arranged a corresponding part of the apparatus 10 for treating the other side of the poultry body.

The apparatus 10 comprises a conveying means 11 which is shown schematically only. The conveying means 11 has at least one transport saddle 12 for receiving and holding the poultry bodies. Each transport saddle 12 is usually arranged stationarily but releasably on the conveying means 11, for example, a revolving conveying chain or the like, and movable in rotation with the latter. The poultry bodies to be treated are saddled or fixed on the transport saddle 12 with the breast facing upwards (rear directed towards the transport saddle) and with a neck attachment facing forwards in the direction of transport T, so that the poultry bodies positioned on the transport saddles 12 can be transported in this position along a separating device 13.

The apparatus 10 further comprises the separating device 13 which has several pairs of separating elements 14, 15, 16. The pairs of separating elements 14 to 16 are arranged one behind the other and/or adjacent to each other in the direction of transport T. The first pair of separating elements 14 in the direction of transport T, and therefore the first to encounter the poultry body, has two cutting blades 17 which are arranged symmetrically to the axis of symmetry S. The cutting blades 17, which are also called banana blades due to their sickle shape, are constructed and designed to perform tendon separating cuts from below from the rear side of the poultry body in the region of the joint between the end pieces of the wings and the poultry body. The second pair of separating elements 15 comprises two separating blades 18 which are also arranged symmetrically to the axis of symmetry S and which are constructed and designed to completely separate the wings between the end pieces and the central pieces of the wings. The third pair of separating elements 16, which is arranged adjacent to and/or behind the second pair of separating elements 15 in the direction of transport T, has two cutting blades 19 which are also arranged symmetrically to the axis of symmetry S and which are constructed and designed to perform further tendon separating cuts from the rear side of the poultry body in the region of the joints between the end pieces of the wings and the poultry body.

The apparatus 10 further comprises two transport units 20 which are arranged symmetrically to the axis of symmetry S. Each transport unit 20 extends from a region in front of the separating device 13 in the direction of transport T, to a point behind the separating device 13, and has a guide rail 21 and a conveying chain 22. The guide rails 21 are arranged stationarily on a frame 23, stand or the like. The conveying chains 22 are guided in a horizontal plane which lies parallel to a plane of transport E defined by the conveying means 11, revolving round at least two, preferably three drive and/or guide rollers 24. The guide rails 21 run laterally of the conveying means 11, wherein the guide rails 21 diverge in the direction of transport T. In other words, the distance between the mutually opposed guide rails 21 is shorter on the input side than on the output side. A section of the conveying chains 22 runs parallel to the guide rails 21, forming a functional unit with the guide rails 21. To be more precise, the guide rails 21 are located above a section of the conveying chains 22 which runs parallel to the guide rails 21. The transport units 20 or functional units consisting of guide rail 21 and conveying chain 22 are constructed and designed to grip and guide the wings along the separating device 13. During transport in the direction of transport T, the two wings are increasingly moved away from the poultry body due to the clamping effect between the guide rails 21 and the conveying chains 22, on the one hand, and the divergence of the transport units 20, on the other hand.

This construction of the apparatus is developed according to the invention by the fact that the cutting blades 19 of the third pair of separating elements 16 form a cutting station without a counter-support. In other words, the third cutting station is formed exclusively by the cutting blades 19, dispensing with a corresponding counter-support. The cutting edges 25 of the cutting blades 19 are constructed and designed to perform partial cuts which leave the end pieces of the wings on the poultry body. This means that the cutting edges 25 are shorter than the cutting edges known from the state of the art, so that the cutting edges 25 (also to be referred to as stub edges) in their cutting position only partially cut the tendons and tissue parts which are not cut through by the first pair of separating elements 14. In addition the lateral guide rails 21 according to the invention have, behind the separating device 13 in the direction of transport T, one recess 26 each for increasing the vertical distance between the guide rails 21 and the conveying chains 22.

The cutting blades 19 of the third pair of cutting elements 16 are designed as approximately triangular delta blades. In this case the cutting edge 25 in its cutting position extends obliquely upwards, starting from the plane of transport E, so that the poultry bodies transported through the apparatus 10 run up the cutting edge 25 after the fashion of a ramp. The cutting edge 25 has on the input side a first, blunt section I which is constructed and designed to thread or introduce the cutting blades 19 into the gap cut by the cutting blades 17 of the first pair of separating elements 14, in the region of the joint between the end pieces of the wings and the poultry body. Section I is followed by a second, sharp-edged section II which is constructed and designed to separate tendons and/or tissue parts. The cutting edge 25 on the output side ends in a third, blunt section III in order to prevent cutting completely through remaining tendons and/or tissue parts. The individual sections I to III can be variable in shape. In addition to a flattened and planar (sections I and III) or sharp-edged (section II) cutting edge 25, the latter can also be cut differently to obtain altered guiding and cutting.

The individual sections I to III can be oriented uniformly with respect to their inclination to the plane of transport E, so that the cut can be influenced by, apart from the shape of the cutting edge 25, active control of the cutting blades 19 as well, which is described below. Preferably section III of the cutting edge 25 has a lower gradient than the first two sections I and II referred to the plane of transport E. Particularly preferably, the last section III in the direction of transport T runs substantially horizontally. In particular embodiments section III can also have a negative gradient, that is, slope down from section II.

As mentioned, the pairs of separating elements 14 to 16 can be actively controllable or stationary and rigid. A preferred embodiment is one in which the cutting blades 17 and 19 of the pairs of separating elements 14 and 16 can be or are controlled actively, while the separating blades 18 of the pair of separating elements 15 are fixed as a stationary blade and are therefore not movable and not controllable. The cutting blades 17 of the first pair of separating elements 14 are controllable or controlled e.g. by a cam controller, which can be formed e.g. on the transport saddle 12. The cutting blades 19 of the third pair of separating elements 16 are controllable or controlled by pneumatic cylinders or the like, wherein this controlling relates to movement of the cutting blades 19 out of a standby position into a cutting position and vice versa. To put it another way, the cutting blades 19 can be folded away laterally. In the cutting position itself, the cutting blades 19 are then stationary during the cutting operation. The controller for the cutting blades 19 can also be extended by the fact that the cutting blades 19 are movable downwards e.g. out of the cutting position during the cutting operation to influence the cut, in order to become disengaged from the poultry body. Other common possible ways of blade control can be used as well. Other embodiments where, for example, all pairs of separating elements 14 to 16 are fixed and rigid or all pairs of separating elements 14 to 16 are actively controlled are possible as well.

As described above, the pairs of separating elements 14 to 16 and in particular the cutting blades 19 of the third pair of separating elements 16 are constructed in such a way that the poultry bodies with the end pieces attached thereto leave the separating device 13. But so that the end pieces are not separated or torn from the poultry body by the diverging transport units 20, the recesses 26 are formed in the guide rails 21 according to aspects of the invention as claimed. The recesses 26 begin immediately behind the last pair of separating elements 16 in the direction of transport T and extend as far as the free end of the guide rails 21 in the direction of transport T. The recesses 26 can also be made shorter, by forming in the guide rails 21 behind the separating device 13 a kind of window which is opened downwardly in the direction of the conveying chain 22. In further embodiments the guide rail 21 can also end directly behind the separating device 13. With respect to the height of the recesses 26 in the vertical direction, starting from the lower edge 27 of the guide rails 21, it is necessary for the latter to have a size which eliminates the clamping effect for the end pieces of the wings between the guide rails 21 and the conveying chains 22. Particularly advantageous is a height which extends over at least half the height of the guide rails 21, starting from their lower edge 27. With respect to the shape of the recesses 26, differences are possible. A rectangular shape of the recesses 26 proved to be particularly simple and reliable for release of the end pieces.

Further preferred and/or appropriate developments of the apparatus 10 according to the invention are described below. The guide rails 21 have on the input side a kind of threading or spreading element 28 by means of which the wings can be held away from the poultry body on entering between the transport units 20. The guide rails 21 further have a horizontally directed slot 29 through which the separating blades 18 of the second pair of separating elements 15 are passed, wherein the cutting edges of the separating blades 18 protrude on the side of the guide rails 21 facing away from the poultry body. The transport units 20 have, in addition to the conveying chains 22 which revolve in a horizontal plane and at least partially below the guide rails 21, one further conveying chain 30, each. The conveying chains 30, which also revolve in the horizontal plane, are also guided round the drive and/or guide rollers 24 and located laterally of the guide rails 21. The conveying chains 30 are located above the conveying chains 22. All of the conveying chains 22, 30 each, on the side facing towards the poultry body or wings, include elements for producing form-locking with the product to be processed. As an example, the conveying chain 22 has mandrels 31 which are directed vertically upwards in the direction of the lower edge 27 of the guide rails 21 and which assist clamping of the wings or, to be more precise, the end pieces. The conveying chains 30 also have mandrels 32 which are directed horizontally in the direction of the guide rails 21.

Below, the principle of the method according to the invention is described in more detail with the aid of the drawings. The poultry bodies travel, seated on the transport saddle 11, with the breast facing upwards and with a neck attachment facing forwards in the direction of transport T, into the apparatus 10. Before the poultry body reaches the separating device 13, the wings are lifted or spread laterally away from the poultry body by the threading or spreading elements 28. Due to spreading of the wings away from the poultry body, as the transport progresses the wings are each threaded in and clamped between a guide rail 21 and a conveying chain 22 of the transport unit 20. Clamping of the wings is effected approximately in the region of the joint between the end piece and the central piece, so that the central pieces (with or without tip) travel on the side of the guide rail 21 facing away from the conveying element 11, while the end piece is located on the side of the guide rail 21 facing towards the conveying element 11. The poultry body itself is transported further on the transport saddle 12 in the direction of transport T.

Positioned in this way, the poultry body with the wings reaches the separating device 13 and with the rear side encounters first the cutting blades 17 of the first pair of separating elements 14. The cutting blades 17 are controlled in their cutting by the transport saddle 12 (or other suitable control means), and cut into tissue parts and some of the tendons in the region of the joint from below (that is, the rear side) between the end piece and the central piece. The cutting position in which the cut is made is prepared by the diverging arrangement of the transport units 20, by pulling the wings outwardly away from the poultry body, so that the cuts do not damage bones or the like. To be more precise, the joint heads are pulled out of the sockets by the diverging transport units 20.

Due to transport in the direction of transport T, the transport saddle 12 on which the poultry body is mounted reaches the next cutting station, namely the separating blades 18 of the second pair of separating elements 15, wherein the clamped wings are moved further and further away from the poultry body by the diverging arrangement of the transport units. Due to transport past the stationary separating blades 18, the central piece is completely separated from the end piece, by the fact that the separating blades 18 enter the region of the joint between the central piece and the end piece. At the same time or after a delay the cuts of the cutting blades 19 of the third pair of separating elements 16 are made. The cutting blades 19, which are stationary during the cutting operation, enter from below (that is, the rear side) the gap produced by the cutting blades 17 between the end piece and the poultry body, and separate further tendons and tissue parts.

Cutting by means of the cutting blades 19 is effected without a counter-support and only so deep that at least one tendon, but preferably two or three tendons remain intact. To put it another way, the cutting depth is determined by the shape and position of the cutting blades and/or a corresponding blade control in such a way that the end pieces with at least one tendon as well as tissue parts remain on the poultry body. In other words, the cuts of the cutting blades 19 are performed as partial cuts which leave the end pieces on the poultry body. Immediately after the last cut, the end pieces are released from clamping between the guide rails 21 and the conveying chains. To be more precise, the end pieces are released from clamping directly behind the cutting blades 19 due to a recess 26 in the guide rails 21 of the transport units 20, before the conveying chains 22 are deflected round one of the drive and/or guide rollers 24 and moved laterally away from the conveying means 11. As a result, outward pulling of the wings or end pieces is completed. The end pieces are thus effectively prevented from being torn off.

While the poultry body with the end pieces attached thereto is guided over the cutting blades 19, the joint region to be cut is first guided over a blunt section I. Actual cutting is effected in a second, sharp-edged section II. After the separation of parts of the tendons that are still present, the joint region is guided over a third, again blunt section III, wherein no further cutting function is performed in the last section.

The individual cutting blades 17 and 19 are preferably actively controlled, while the separating blades 18 are fixed and not controlled. Naturally, the separating blades 18 can also be actively controlled. Likewise it is possible for the cutting blades 17 and 19 to be fixed and not controlled.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. An apparatus for automated cutting of the wings from poultry bodies, the poultry bodies including a breast, a neck attachment, a rear side, the wings including an end piece attached directly to the poultry body by a joint, a tip opposite the end piece, and a central piece between the end piece and the tip, comprising:
  a conveying means having at least one transport saddle for receiving and holding the poultry bodies and transporting them, with the breast facing upwards and with the neck attachment facing forwards in the direction of transport, through the apparatus along a separating device,
  wherein the separating device comprises several pairs of separating elements each arranged symmetrically on both sides of the conveying means,
  wherein the several pairs of separating elements comprise:
    a first pair of cutting blades for performing tendon separating cuts from the rear side of the poultry body in the region of the joint between the end pieces of the wings and the poultry body,
    a second pair of separating blades for completely separating the wings between the end pieces and the central pieces of the wings, and
    a third pair of cutting blades for performing further tendon separating cuts from the rear side of the poultry body in the region of the joints between the end pieces of the wings and the poultry body,
  wherein on each side of the conveying means is arranged a transport unit which is composed of a guide rail and a conveying chain and which extends from a region in front of the separating device in the direction of transport to a point behind the separating device and is constructed and designed for gripping and guiding the wings along the separating device,
  wherein the two transport units arranged symmetrically to the conveying means diverge in the direction of transport in such a way that the two wings of a poultry body are moved increasingly away from the poultry body during transport along the separating device, characterised in that the cutting blades of the third pair form a cutting station without a counter-support and each have a cutting edge which is constructed and designed to perform partial cuts leaving the end pieces of the wings on the poultry body, and in that the guide rails behind the separating device in the direction of transport have one recess, each, to increase the vertical distance between the guide rails and the conveying chain.

2. The apparatus according to claim 1, characterised in that the cutting blades of the third pair of cutting blades are constructed as an approximately triangular delta blade, and
the cutting edges of the third pair of cutting blades facing towards the poultry body have in the direction of transport a first, blunt section, a second, sharp-edged section and a third, blunt section.

3. The apparatus according to claim 2, characterised in that the third, blunt section of the cutting edges in the direction of transport has a lower gradient than the first, blunt and the second sharp-edged sections, referred to the plane of transport of the poultry bodies.

4. The apparatus according to claim 3, characterised in that the first pair of cutting blades and the third pair of cutting blades are actively controlled.

5. The apparatus according to claim 1, characterised in that the first pair of cutting blades and the third pair of cutting blades are actively controlled.

6. The apparatus according to claim 1, characterised in that the second pair of separating blades is constructed and arranged stationarily.

7. The apparatus according to claim 1, characterised in that the recess of each the guide rail begins immediately behind the last pair of separating elements in the direction of transport and extend as far as a free end of the guide rails in the direction of transport.

8. The apparatus according to claim 1, characterised in that the recess of each guide rail extends over at least half the height of the guide rails, each starting from a lower edge of the guide rails facing towards the conveying chain.

9. The apparatus according to claim 1, characterised in that the recess is of rectangular construction.

10. The apparatus according to claim 1, characterised in that each conveying chain has elements for producing a form-locking connection with the poultry body and/or the wings or parts thereof.

11. A method for automated cutting of the wings from poultry bodies, the poultry bodies including a breast, a neck attachment, a rear side, the wings including an end piece attached directly to the poultry body by a joint, a tip opposite the end piece, and a central piece between the end piece and the tip, the method comprising the steps of:
  delivering the poultry bodies by a conveying means into a separating device which has several pairs of separating elements each arranged symmetrically on both sides of a conveying means;
  clamping the wings in the region of the joint between the end piece and the central piece of the wing each between a guide rail and a conveying chain of a transport unit arranged on both sides of the conveying means;
  separating tendons and tissue parts from the rear side of the poultry body in a region of the joint between the end pieces of the wings and the poultry body using a first pair of cutting blades;
  completely separating the wings between the end pieces and the central pieces of the wings using a second pair of separating blades; and
  separating tendons and tissue parts from the rear side of the poultry body in the region of the joint between the end pieces of the wings and the poultry body using a third pair of cutting blades, wherein the wings are increasingly pulled outwards away from the poultry body by the transport units during transport in the direction of transport and all cuts are made during transport of the poultry bodies along the pairs of separating elements, characterised in that the separation of tendons and tissue parts using the third pair of cutting blades is effected without a counter-support and only so deep into the region of the joint that the end pieces of the wings with at least one tendon as well as tissue parts remain on the poultry body, wherein the end pieces immediately after being cut by the third pair of cutting blades are released from clamping by a recess in the guide rail of the transport unit.

12. The method of claim 11, wherein:
the cutting blades of the third pair of cutting blades are constructed as an approximately triangular delta blade, and
the third pair of cutting blades each have a cutting edge facing towards the poultry body that has in the direction of transport a first, blunt section, a second, sharp-edged section and a third, blunt section.

13. The method of claim 12, wherein the third section of the cutting edges in the direction of transport has a lower gradient than the first and second sections, referred to the plane of transport of the poultry bodies.

14. The method of claim 13, wherein the first pair of cutting blades and the third pair of cutting blades are actively controlled.

15. The method of claim 11, wherein the first pair of cutting blades and the third pair of cutting blades are actively controlled.

16. The method of claim 11, wherein the second pair of separating blades is constructed and arranged stationarily.

17. The method of claim 11, wherein the recess of the guide rail begins immediately behind the last pair of separating elements in the direction of transport and extends as far as a free end of the guide rail in the direction of transport.

18. The method of claim 11, wherein the recess extends over at least half the height of the guide rail, the recess starting from a lower edge of the guide rail facing towards the conveying chain.

19. The method of claim 11, wherein the recess is of rectangular construction.

20. The method of claim 11, wherein each conveying chain has elements for producing a form-locking connection with the poultry body and/or the wings or parts thereof.

* * * * *